United States Patent
Comeau et al.

(10) Patent No.: US 6,794,017 B2
(45) Date of Patent: Sep. 21, 2004

(54) MOLD-RESISTANT CORRUGATED CARBOARD FOR VOID-FORMING STRUCTURES AND PROCESS

(75) Inventors: Dominic Hamel Comeau, Quebec (CA); Michael L. Rosenblat, Winnipeg (CA)

(73) Assignee: Voidform International Ltd. (CA)

(*) Notice: Subject to any disclaimer, the term of this patent is extended or adjusted under 35 U.S.C. 154(b) by 0 days.

(21) Appl. No.: 10/459,287

(22) Filed: Jun. 11, 2003

(65) Prior Publication Data

US 2004/0033343 A1 Feb. 19, 2004

Related U.S. Application Data

(60) Provisional application No. 60/388,134, filed on Jun. 12, 2002.

(51) Int. Cl.[7] .............................. B32B 3/28; D21H 11/00
(52) U.S. Cl. ........................ 428/182; 156/292; 162/161
(58) Field of Search .............................. 428/182, 537.5; 156/205, 207, 290, 292; 162/112, 161

(56) References Cited

U.S. PATENT DOCUMENTS

| 1,892,311 | A | | 12/1932 | MacDonald |
|---|---|---|---|---|
| 2,881,501 | A | | 4/1959 | Raney |
| 3,024,513 | A | | 3/1962 | Shuxteau et al. |
| 3,085,026 | A | * | 4/1963 | Weisgerber et al. ........ 428/182 |
| 3,109,217 | A | | 11/1963 | Kell |
| 3,358,960 | A | | 12/1967 | Oliver et al. |
| 3,512,747 | A | | 5/1970 | Stark |
| 6,050,043 | A | | 4/2000 | Rosenblat et al. |
| 6,116,568 | A | | 9/2000 | Rosenblat et al. |
| 6,228,158 | B1 | * | 5/2001 | Skuratowicz ............ 106/208.1 |

* cited by examiner

Primary Examiner—Donald J. Loney
(74) Attorney, Agent, or Firm—Piper Rudnick LLP

(57) ABSTRACT

Corrugated cardboard that resists the growth of mold includes single and double face liners produced with pulp and starch where the latter is diluted with water to which biocides have been added. The liner biocides include 5-chloro-2-methyl-4-isothiazolin-3-one, hypochlorite and sodium hydroxide and sodium bromide. A fluted medium is sandwiched between the single and double face liners with an adhesive that is produced with diluted starch and to which biocides have also been added. The biocides in the adhesive include 1,2-benzothiazol-3(2H)-one and poly[oxyethylene (dimethyliminio)ethylene dichloride].

20 Claims, 4 Drawing Sheets

MOLD-RESISTANT CORRUGATED CARBOARD FOR VOID-FORMING STRUCTURES AND PROCESS

CLAIM OF PRIORITY

This application claims priority from U.S. Provisional Patent Application Serial No. 60/388,134 filed Jun. 12, 2002, currently pending.

BACKGROUND OF THE INVENTION

The present invention relates generally to paperboard and cardboard products and, more particularly, to corrugated cardboard and structures for forming voids that are constructed therefrom that are resistant to mold growth.

It is commonly known in the construction industry to create spaces or voids in or under various types of concrete formations. For example, concrete formations below grade such as the structural foundation of a building often require a space or void between the foundation and the ground to accommodate expansion of the soil, thereby preventing damage to the foundation. Thus, it is often desirable to create a void between the structural floor and/or grade beams of a foundation and the underlying soil to accommodate upheaval of the soil. It may also be desirable to create a void between the walls of a foundation and the surrounding soil to accommodate a similar expansion of the soil below grade. In addition, voids can also be utilized above grade between concrete floor slabs to reduce the amount of concrete required and to make the resulting slab lighter.

Another type of concrete formation that sometimes requires a void is a concrete pillar or column. It is often desirable to create a void in a pillar or column to allow room for internal plumbing, electrical conduits or the like within the column. By forming a void in the column, the items within the column are protected and the cost of making the column can be reduced because less concrete is required.

Typically, these voids are created by placing a biodegradable support structure made of corrugated cardboard in the desired location. These support structures are configured to support the building structural components until the poured concrete is capable of holding its own weight. As the concrete dries, and as the cardboard eventually deteriorates, a void is left in the concrete formation. Examples of such support structures (which are known in the industry as "voids") are available from VoidForm International Ltd. of Canada.

In recent years, however, engineers have become concerned in that mold and bacteria have been discovered in home and building basements and foundations. More specifically, engineers are concerned that cardboard voids may be the cause of the mold and bacteria in that the mold grows on the void and bacteria feeds on the cardboard. A need thus exists for corrugated cardboard that does not grow mold or bacteria and void-forming structures constructed from the cardboard that are used with concrete during construction projects.

Accordingly, it is an object of the present invention to provide corrugated cardboard that resists growth of mold and spores.

It is another object of the present invention to provide structures for forming voids in concrete during construction processes where the voids resist growth of mold and spores.

It is still another object of the present invention to provide a process for producing mold-resistant corrugated cardboard and structures for forming voids.

SUMMARY OF THE INVENTION

The present invention is directed to corrugated cardboard that resists the growth of mold and a process for producing it. The cardboard is particularly useful in the construction of void-forming structures. The cardboard is constructed from single and double face liners containing starch, biocide, water and pulp. The biocides in the liners include 5-chloro-2-methyl-4-isothiazolin-3-one, hypochlorite and sodium hydroxide and sodium bromide. A fluted medium is sandwiched between the single face and double face liners. Adhesive secures the fluted medium to the single face and double face liners. The adhesive is constructed from starch and diluting water and has mixed therewith biocides that include 1,2-benzothiazol-3(2H)-one and poly[oxyethylene (dimethyliminio)ethylene dichloride]. A protective coating, such as wax or polyurethane, may be disposed on one of the liners.

In the production of the cardboard, the liner biocides are added to the water that is used to dilute the starch that is mixed with pulp to form the single and double face liners. Starch and diluting water are combined to form the adhesive which is then mixed with the adhesive biocides. A fluted medium is sandwiched between the single face liner and the double face liner and is secured to the liners with the adhesive. The protective coating is then added to one of the liners.

The following detailed description of embodiments of the invention, taken in conjunction with the accompanying drawings and claims, provide a more complete understanding of the nature and scope of the invention.

DESCRIPTION OF THE PREFERRED EMBODIMENTS

Figure 1:
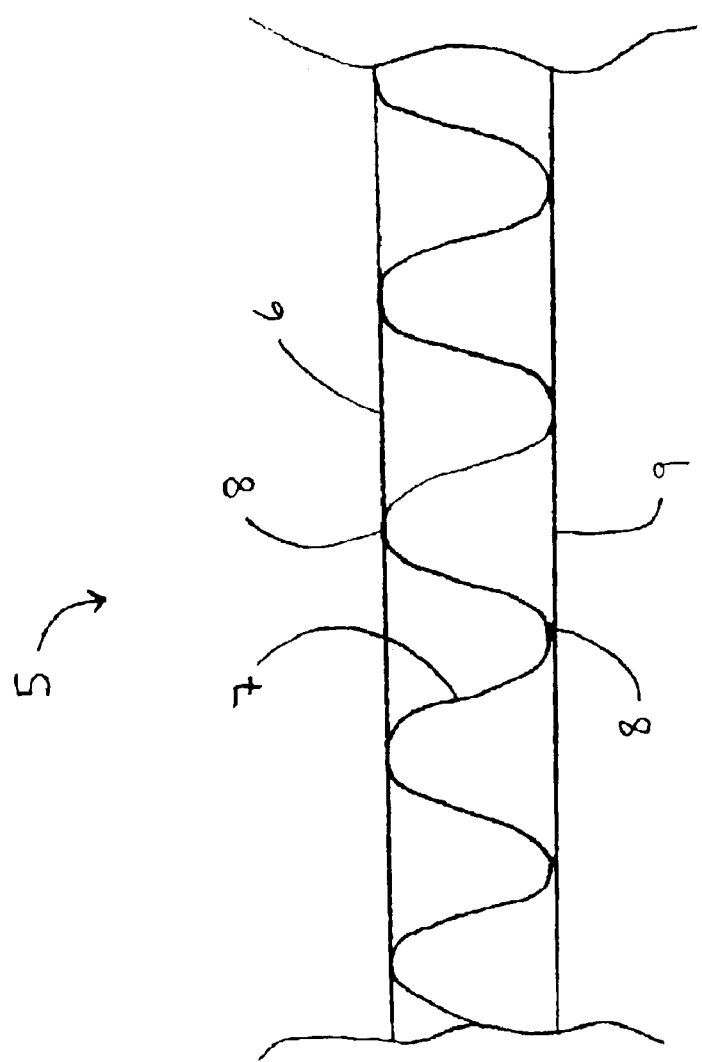
FIG. 1 is a sectional view of an embodiment of the mold-resistant corrugated cardboard of the present invention.

With reference to FIG. 1, a section of corrugated cardboard or paperboard constructed in accordance with the present invention is indicated in general at 5. It is to be understood that the terms cardboard and paperboard may be used interchangeably below.

As is known in the art, the cardboard includes a first "single face" liner 6 to which a fluted or corrugated medium 7 is bonded via a starch-based adhesive 8. A second "double face" liner 9 is applied to the remaining exposed side of the fluted medium 7, also with the adhesive. Such materials are characterized by their low cost, light weight and high strength. Corrugated cardboard 5, however, has been constructed in accordance with the present invention and, as a result, offers the additional benefit of a resistance to the growth of mold and spores.

Figure 2:
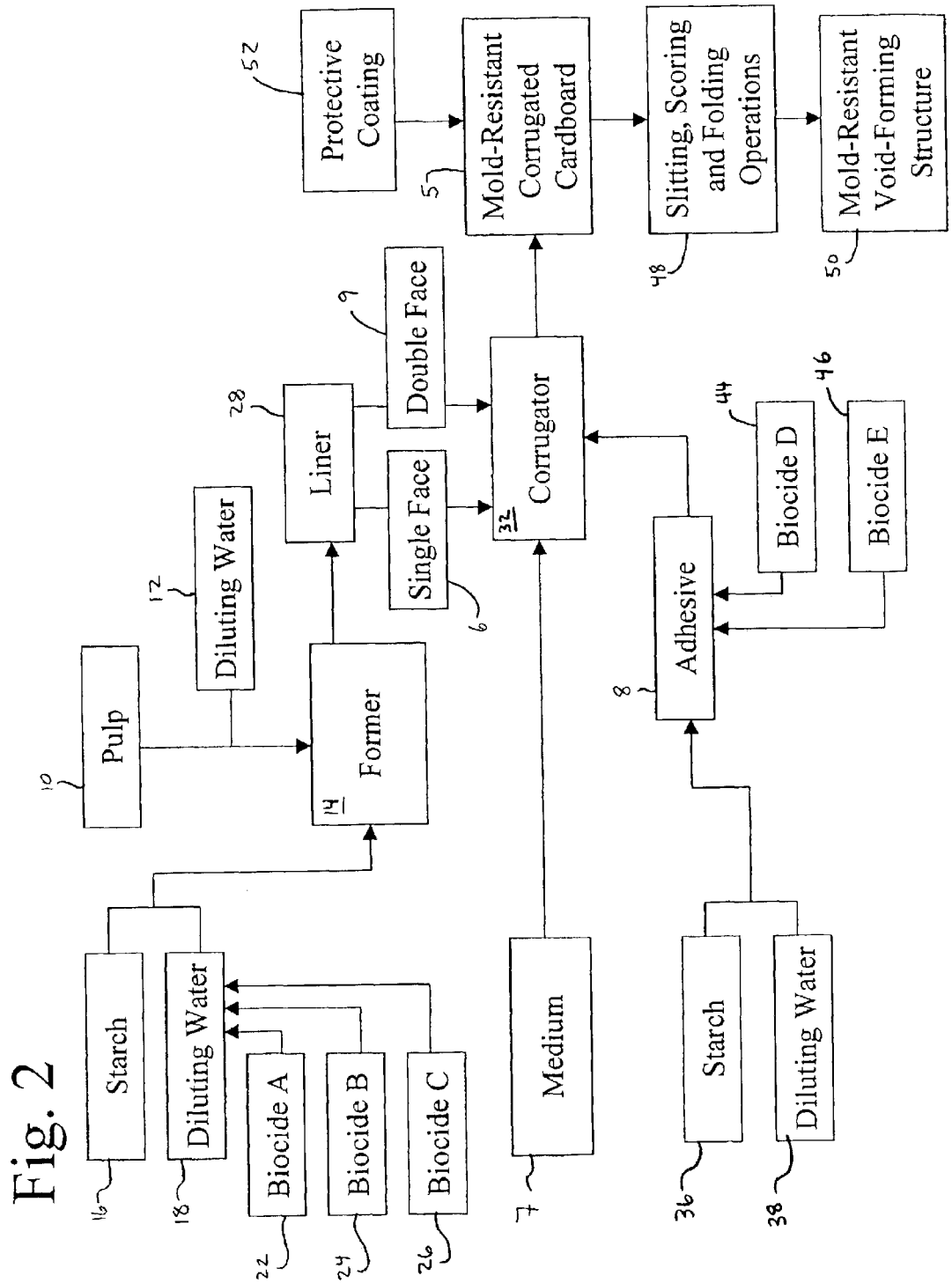
FIG. 2 is a flow chart illustrating an embodiment of the process of the present invention.

A process for producing mold-resistant corrugated cardboard and void-forming structures in accordance with the present invention is illustrated in FIG. 2. Paper pulp 10 is diluted with diluting water 12 and directed to a former 14. Pulp 10 preferably is made of 100% recycled fibers from old carton containers (OCC). The fibers preferably are re-pulped in a pulper and passed through different screening stages in order to rid the pulp of dirt particles. The clean pulp is then diluted with the diluting water 12 and routed to a former 14.

In addition to the cleaned and diluted pulp, starch 16 diluted with diluting water 18 is added to the former 14. The starch is added to the pulp to improve the strength of the liner. Prior to mixing the starch 16 and diluting water 18, however, biocides A, B and C, indicated at 22, 24 and 26, respectively, are added to the diluting water.

Biocides A, B and C are preferably those listed in the following tables and preferably are provided in the quantities listed.

| Biocide | Product Name | Key Ingredient(s) | Quantity |
|---------|--------------|-------------------|----------|
| A | BUSAN 1081 | 5-chloro-2-methyl-4-isothiazolin-3-one | 0.03 kg/ton of liner |
| B | BULAB 6044 | hypochlorite and sodium hydroxide | 0.03 kg/ton of liner |
| C | BUSAN 1167 | sodium bromide | 0.04 kg/ton of liner |

All three of these biocides may be acquired from Buckman Laboratories of Canada, Ltd. It is to be understood that biocides containing the key ingredients listed for each of Biocides A, B and C may be substituted for the biocide products listed. In addition, the quantities of the biocides added to the diluting water of the starch may vary by plus or minus 0.005 kg/ton of liner.

In the former 14, the diluted starch containing the biocides is added to the diluted and cleaned pulp and the liner 28 is formed. The liner is then directed to the corrugator 32 as single face liner 6 and double face liner 9.

As indicated at 7, a medium is also provided to the corrugator 32. It is unnecessary for the medium to contain any biocide. It is preferable, however, that the process temperature used to produce the medium is warm enough to kill any bacteria. Such a temperature would be in the range of 150° F. to 170° F. Processes for manufacturing the medium are well known in the art, and these processes may be used to produce the medium 7. The medium preferably is constructed from semi-chemical virgin pulp (60%) and recycled fibers (40%) where the latter is mainly OCC. Such a medium is available from the Trenton Division of Norampac Inc. of Canada.

Starch 36 diluted with water 38 is used to create the adhesive 8 that is provided to the corrugator 32. Starch 36 preferably is a commercial dry starch, such as DURA-BOND A, that is cooked and then diluted with diluting water 38. DURA-BOND A is available from NACAN Products Limited of Canada. The adhesive preferably is formed in a tank having a capacity of 2000 liters.

Biocides D and E, indicated at 44 and 46, respectively in FIG. 2, are added to the adhesive 8 in the tank. For the tank size provided above, the following biocide quantities are preferably added per tank full of adhesive:

| Biocide | Product Name | Key Ingredients | Quantity |
|---------|--------------|-----------------|----------|
| D | PROXEL GXL | 1,2-benzothiazol-3(2H)-one | 500 ml |
| E | BUSAN 77 | poly[oxyethylene(dimethyliminio)ethylene dichloride] | 500 ml |

BUSAN 77 may be acquired from Buckman Laboratories of Canada, Ltd. PROXEL GXL may be acquired from HCI Canada Inc. It is to be understood that biocides containing the key ingredients listed for each of Biocides D and E may be substituted for the specific biocide products listed. In addition, the quantities of the biocides added to the adhesive may vary by plus or minus 10 ml for the tank quantity given.

It should be noted that, alternatively, an adhesive that does not contain any starch could be substituted for the starch described above to create the corrugated cardboard of the present invention.

The corrugator 32 flutes the medium and combines it with the single and double face liners and adhesive to form the mold resistant cardboard of the present invention, illustrated at 5 in FIGS. 1 and 2. More specifically, the corrugator 32 preferably includes a single facer unit which receives single face liner 6 from a takeoff roll and medium 7 from another takeoff roll. The single facer unit corrugates the medium between two corrugator rolls, applies adhesive 8 to the fluting and applies the single face liner 6 to the adhesive and medium with a pressure roll.

The single face corrugated material then receives the double face liner 9. The double face corrugated material then preferably proceeds through a hot and cold traction section which applies pressure with a belt and typically cures the adhesive bond. As a result, the mold-proof corrugated cardboard 5 of the present invention is formed. The portions of the corrugator line which precede the hot and cold traction section are frequently known as the "wet end" or "process end" of the line.

While the above is a description of the preferred corrugator arrangement, other corrugation or corrugated cardboard manufacturing methods are known in the art and may be used to join the liner, medium and adhesive described above into the mold-resistant cardboard of the present invention.

After the resulting mold-resistant corrugated cardboard 5 leaves the corrugator 32, it proceeds through slitting scoring and folding operations 48 at the so-called "dry end" of the line so that void forming structures may be created. More specifically, the corrugated cardboard 5 may proceed through a rotary shear, a slitter/scorer and a chop knife. These devices shear, slit and score and cut the corrugated cardboard to the desired specifications so that flat sheets or blanks are formed which may be folded and assembled into void-forming structures 50.

As indicated at 52 in FIG. 2, a protective coating may optionally be applied to one side of the mold-resistant corrugated cardboard 5 so that the exterior surface of the void-forming structure created from the cardboard is provided with temporary protection prior to installation at a construction site. In a preferred embodiment, the coating is wax. In case of extremely wet ground conditions, it may be desirable to cover the void-forming structure with a water resistant membrane such as a polyurethane coating, preferably about 4 millimeters thick.

Figure 3:
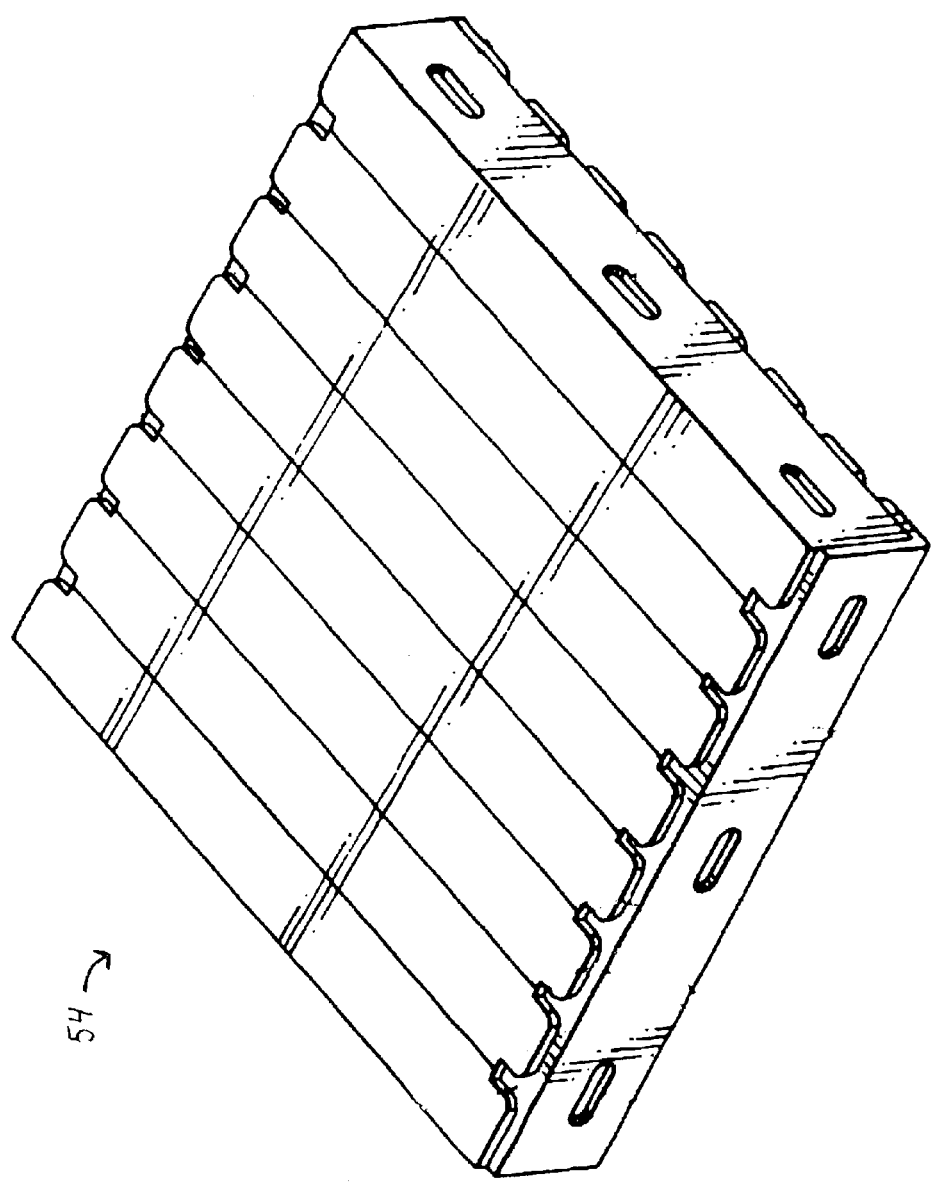
FIG. 3 is a perspective view of a void-forming structure that, in accordance with the present invention, is constructed with the corrugated cardboard of FIGS. 1 and 2.
Figure 4:
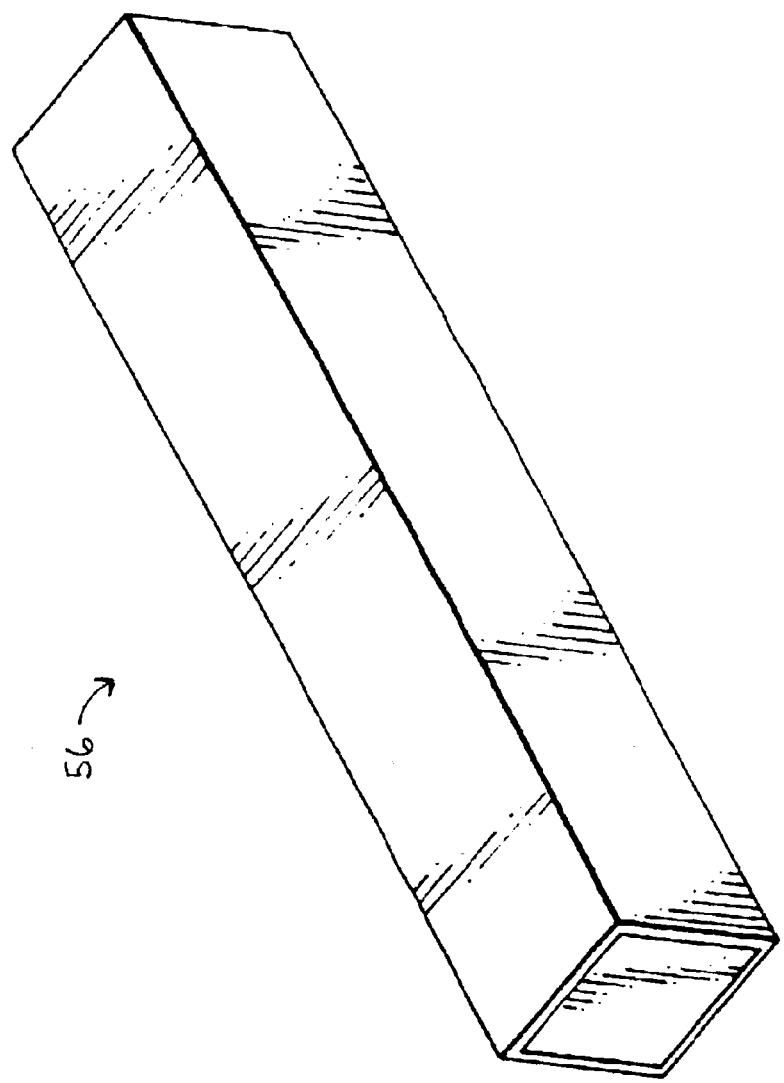
FIG. 4 is a perspective view of a second void-forming structure that, in accordance with the present invention, is constructed with the corrugated cardboard of FIGS. 1 and 2.

Examples of void-forming structures constructed from the mold-resistant cardboard of the present invention are indicated in general at 54 and 56 in FIGS. 3 and 4, respectively. Details regarding the construction of these voids are presented in commonly assigned U.S. Pat. Nos. 6,050,043 and 6,116,568, both to Rosenblat et al., the contents of which are incorporated herein by reference.

It is to be understood that the void-forming structures of FIGS. 3 and 4 are presented as examples only and that the invention contemplates any corrugated cardboard void-forming structure constructed with the mold-resistant cardboard described above. Examples include, but are not limited to, the void-forming structures presented in U.S. Pat. No. 1,892,311 to MacDonald, U.S. Pat. No. 2,881,501 to Raney, U.S. Pat. No. 3,024,513 to Shuxteau et al., U.S. Pat. No. 3,109,217 to Kell, U.S. Pat. No. 3,358,960 to Oliver et al. and U.S. Pat. No. 3,512,747 to Stark.

A key to the effectiveness of the present invention is the combination of the biocides with the starch in the liner and the adhesive. Mold (bacteria) feed on sugar (starch) to survive. The biocides added in accordance with the present invention are strong enough to kill the bacteria and/or to prevent them from eating the starch in the cardboard.

While the preferred embodiments of the invention have been shown and described, it will be apparent to those skilled in the art that changes and modifications may be made therein without departing from the spirit of the invention, the scope of which is defined by the appended claims.

What is claimed is:

1. Corrugated cardboard that resists the growth of mold comprising:
    a. a single face liner containing starch, biocide, water and pulp;
    b. a double face liner containing starch, biocide, water and pulp;
    c. a fluted medium sandwiched between the single face and double face liners; and
    d. adhesive securing the fluted medium to the single face and double face liners.

2. The corrugated cardboard of claim 1 further comprising a protective coating disposed on one of the liners.

3. The corrugated cardboard of claim 1 wherein the adhesive includes a biocide.

4. The corrugated cardboard of claim 3 wherein the biocide in the adhesive includes 1,2-benzothiazol-3(2H)-one.

5. The corrugated cardboard of claim 3 wherein the biocide in the adhesive includes poly[oxyethylene(dimethyliminio)ethylene dichloride].

6. The corrugated cardboard of claim 3 wherein the biocide in the adhesive includes 1,2-benzothiazol-3(2H)-one and poly[oxyethylene(dimethyliminio)ethylene dichloride].

7. The corrugated cardboard of claim 1 wherein the biocide in the liners includes 5-chloro-2-methyl-4-isothiazolin-3-one.

8. The corrugated cardboard of claim 1 wherein the biocide in the liners includes hypochlorite and sodium hydroxide.

9. The corrugated cardboard of claim 1 wherein the biocide in the liners includes sodium bromide.

10. The corrugated cardboard of claim 1 wherein the biocide in the liners includes 5-chloro-2-methyl-4-isothiazolin-3-one, hypochlorite and sodium hydroxide and sodium bromide.

11. A process for producing corrugated cardboard that resists the growth of mold comprising the steps of:
    a. adding a biocide to diluting water;
    b. diluting a starch with the diluting water containing the biocide;
    c. combining the diluted starch with pulp to produce a single face liner and a double face liner;
    d. sandwiching a fluted medium between the single face liner and the double face liner; and
    e. securing the single face liner and double face liner to the medium with an adhesive.

12. The process of claim 11 further comprising the step of adding a protective coating to one of the liners.

13. The process of claim 11 further comprising the step of adding a biocide to the adhesive prior to step e).

14. The process of claim 13 wherein the biocide in the adhesive includes 1,2-benzothiazol-3(2H)-one.

15. The process of claim 13 wherein the biocide in the adhesive includes poly[oxyethylene(dimethyliminio)ethylene dichloride].

16. The process of claim 13 wherein the biocide in the adhesive includes 1,2-benzothiazol-3(2H)-one and poly[oxyethylene(dimethyliminio)ethylene dichloride].

17. The process of claim 11 wherein the biocide in the liners includes 5-chloro-2-methyl-4-isothiazolin-3-one.

18. The process of claim 11 wherein the biocide in the liners includes hypochlorite and sodium hydroxide.

19. The process of claim 11 wherein the biocide in the liners includes sodium bromide.

20. The process of claim 11 wherein the biocide in the liners includes 5-chloro-2-methyl-4-isothiazolin-3-one, hypochlorite and sodium hydroxide and sodium bromide.

\* \* \* \* \*